United States Patent

Harbort

[15] 3,639,257

[45] Feb. 1, 1972

[54] MICROCAPSULES AS CARRIERS FOR COLOR REACTION COMPONENTS IN COLOR REACTION PAPER AND PROCESS OF MAKING SAID MICROCAPSULES

[72] Inventor: Ludwig Harbort, Hannover, Germany

[73] Assignee: Gunther Wagner Pelikan-Werke, Hannover, Germany

[22] Filed: June 24, 1968

[21] Appl. No.: 739,363

[30] Foreign Application Priority Data

June 23, 1967 Germany..............................W 44228
June 24, 1967 Germany..............................W 44240

[52] U.S. Cl. .........................252/316, 106/308 C, 117/36.2, 117/100 A, 117/100 B, 162/162, 264/4
[51] Int. Cl. ......................................B01j 13/02, B44d 1/02
[58] Field of Search ................252/316; 424/35; 117/110 A, 117/100 B, 36.2; 264/4

[56] References Cited

UNITED STATES PATENTS

| | | | |
|---|---|---|---|
| 3,016,308 | 1/1962 | Macaulay | 252/316 X |
| 3,041,289 | 6/1962 | Katchen et al. | 252/316 |
| 3,137,630 | 6/1964 | Hecker et al. | 264/14 |
| 3,179,600 | 4/1965 | Brockett | 252/316 X |

Primary Examiner—Richard D. Lovering
Attorney—McGlew and Toren

[57] ABSTRACT

Process of making microcapsules as carriers for encapsulated solid or liquid color components in color reaction papers, wherein particles of finely divided solid substances are incorporated in the capsule walls during the formation of the capsules by chemical reaction from a film forming component dissolved in the dispersed phase of a liquid dispersion system, which contains dissolved in its continuous phase a low-molecular weight reactant for the film-forming component; also contained in the dispersion system are said solid particles to be incorporated into the walls of the microcapsules. Very high percentages of solid particles, i.e., considerably higher than 100 percent calculated on the weight of the capsule wall, can thus be incorporated into the latter thereby increasing the resistance of the walls to mechanical stress far above the limit of known microcapsules.

2 Claims, 1 Drawing Figure

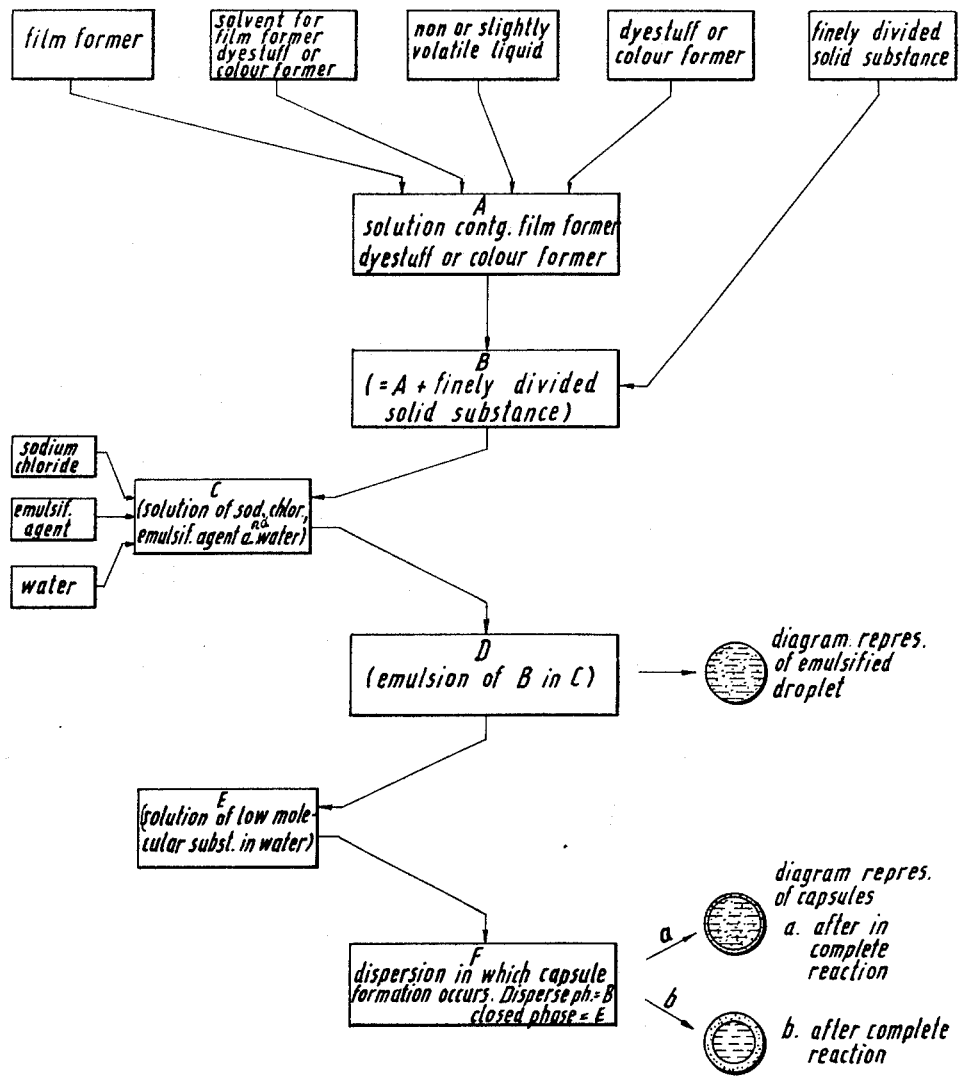

MICROCAPSULES AS CARRIERS FOR COLOR REACTION COMPONENTS IN COLOR REACTION PAPER AND PROCESS OF MAKING SAID MICROCAPSULES

SUMMARY OF THE INVENTION

The present invention relates to miniature or microcapsules as carriers for color components in color reaction papers and a process of making said microcapsules. The invention further includes a method for preparing color reaction paper with the microcapsules-containing materials made according to the invention.

In duplicating papers making use of the color reaction process it has recently become known to use microcapsules in which color components are enclosed. These processes have the advantage that no undesirable reaction between color-producing substances can take place during handling and storage.

Difficulties are however encountered in the preparation of the papers, since the microcapsules are very sensitive to mechanical stress because the walls of the capsules are very thin. Special precautionary measures are therefore necessary during the incorporation into the coating composition of the paper or the paper pulp in order to avoid damage to the capsules.

Several attempts have been made to overcome the above difficulties, one of which consists in making double walled capsules; this, however, is not a satisfactory solution of the problem, because it involves additional operations in the processing and consequently raises the costs; moreover, it was found that the microcapsules so produced are not satisfactory for practical purposes in every respect.

In another process previously developed by the same inventor, microcapsules were produced enclosing liquid or solid substances, by producing an insoluble reaction product from a film-forming component dissolved in the dispersed phase of a liquid dispersion system, which also contains, in its continuous phase, a low-molecular weight substance; the reaction of the two dissolved substances results in said insoluble capsule-forming product. In this case, too, the capsules are thin walled and present the same difficulties in handling as above explained.

It is an object of the present invention to overcome the disadvantage of the weakness of the walls of the microcapsules and to provide microcapsules of sufficient strength and stability and for being used in the production of color reaction papers without any precautionary measures being necessary.

It is another object of the invention to provide a process for making such microcapsules.

It is yet another object to provide color reaction papers with the microcapsules-containing materials made according to the invention.

Other objects and advantages of the invention will become apparent from the following detailed description.

It was found that according to the invention the objects are realized when in further development of the process for making microcapsules by chemical reaction, from a liquid dispersion, of a polymeric product by the reaction of two components dissolved in the dispersed and the continuous phases of said liquid system, respectively, particles of finely divided solid substances are incorporated into the walls of the capsules under formation.

It was also found that for practical purposes it is very advantageous to use as chemical reaction the saponification of a cellulose ester of an organic acid or the denitration of cellulose nitrate, which is dissolved in the dispersed liquid phase, by a low-molecular substance dissolved in the continuous phase, for instance by alkali metal hydroxide or sodium hydrogen sulfide, the reaction resulting in a product insoluble in both the dispersed and the liquid phases. While this reaction occurs, the finely divided solid substances which are suspended in the dispersed phase are to a substantial extent built into the walls of the microcapsules, thus increasing the strength thereof so as to positively exclude damages to the microcapsules during their incorporation into paper pump or paper-coating materials.

The finely divided solid substances can be of various types. For the production of duplicating papers with color reaction components, primarily colorless or white solid substances should be chosen.

It has been found that the stability of the microcapsules according to the process of this invention will generally be increased proportionately with the contents of solid substances in the walls of the capsules. It is thus possible, substantially to graduate the stability and the strength properties of the microcapsules and to adapt them to the actual purpose for which they are used. It is possible to incorporate in the walls of the capsules up to 750 percent by weight of finely divided solid substances, calculated on the weight of the capsule walls. The process has a further advantage: by using white pigments with high-covering power, for example, zinc sulphide and titanium dioxide, it is possible to obtain microcapsules which, because of their optical reflection properties, also permit the use of color components of relatively strong natural coloring for colorless duplicating papers; hitherto such colorants could not be considered for this purpose.

If the low-molecular weight substance dissolved in the continuous phase is allowed to act on the dispersed phase containing the cellulose ester and the finely divided solid substance until the entire cellulose ester is converted into the polymeric reaction product, then the solid substance finely divided in the dispersed phase is completely deposited in the capsule wall which will then consist of the polymerlike reaction product, and particularly thick walled capsules are obtained enveloping a liquid core. If the reaction is prematurely stopped, capsules are obtained which have thinner walls and whose walls contain only a part of the solid substance finely dispersed in the dispersed phase. The residual portion of the solid substance remains dispersed in the liquid core of the capsules, in which a corresponding portion of unreacted film-forming substance is dissolved.

As already mentioned, one of the advantages of this process, as compared to other capsule-forming processes in which likewise solid substances can be incorporated into the capsule wall, consists in that far greater quantities of finely divided solid substances can be transferred into the capsule wall. By this means, capsules are obtained which show a decidedly better stability with respect to mechanical stress. In accordance with the process more fully described below, it is possible to incorporate very high percentages by weight of different finely divided solid substances into the capsule wall, i.e., considerably more than 100 percent, calculated on the weight of the capsule wall. When using solid particles having high covering power, as for example titanium dioxide or carbon black, it is possible to obtain capsules by this process which are impervious to light, so that the colored contents of the capsules are substantially hidden and light sensitive substances can be encapsulated, whereby new possibilities of using encapsulated substances can be obtained.

In the following examples the invention will be described in full detail but it should be understood that the examples are only given by way of illustration and not of limitation and many changes and modifications in the details can be made without departing from the spirit of the invention.

All parts are by weight where not otherwise indicated.

EXAMPLE I

Dispersed Phase

Solution of 3-methyl spiro-dinaphthopyran and cellulose acetobutyrate, the latter as film former in a mixture of cyclohexanone and diphenoxyethyl formal, in which titanium dioxide is suspended.

Continuous phase

Solution of sodium hydroxide in water.

34 parts of cellulose acetobutyrate (acetyl content 13 percent, butyryl content 37 percent) are dissolved together with 1 part of 3-methyl spiro-dinaphthopyran in a mixture of 40 parts of cyclohexanone and 25 parts of diphenoxyethyl formal and 6.8 parts of finely divided titanium dioxide are suspended in this solution. The suspension is heated to 80° C., it is dispersed in 330 parts of a 9 percent aqueous sodium chloride solution which is heated to 80° C.* (*The so obtained emulsion is poured while stirring into 275 parts of weight of aqueous 18 percent sodium hydroxide solution, which is heated to 70° C.) After a reaction period of 15 minutes, all of the cellulose acetobutyrate, which had been present in the droplets of the emulsion is converted into cellulose, and capsules have been formed whose walls, consisting of cellulose, contain incorporated therein all of the titanium dioxide which had been present. The ratio of weight in the walls is therefore 40 percent of titanium dioxide, since in the saponification of the cellulose acetobutyrate 50 percent of cellulose are produced. The capsules which have a size of 5 to 30$\mu$ are washed with water. Thereby, the cyclohexanone is removed from the contents of the capsules and there remains the solution of the color forming compound in diphenoxyethyl formal. The capsules have a good stability. They can be used for the production of color reaction papers.

EXAMPLE II 20 parts of finely divided zinc sulphide are suspended in a solution of 1 part of color forming compounds and 25 parts of cellulose acetobutyrate (13 percent acetyl, 37 percent butyryl), in a mixture of 49 parts of cyclohexanone and 25 parts of liquid chlorinated paraffin. The suspension is heated to 80° C. and dispersed in 390 parts of a 9 percent aqueous sodium chloride solution, whereafter the emulsion obtained is incorporated by stirring into 353 parts of an 18 percent solution of sodium hydroxide in water. After a reaction time of 15 minutes at 70° C., the entire quantity of cellulose acetobutyrate, which had been present in the droplets of the emulsion, is converted into cellulose and the entire quantity of zinc sulphide becomes part of the walls of the capsules formed from the cellulose. Consequently, 160 percent of zinc sulphide calculated on the weight of cellulose have been incorporated therein. The size of the capsules is 5–20$\mu$. Owing to their high content of solid particles, they are even more stable than the capsules obtained according to example I.

EXAMPLE III 20 parts of finely divided zinc sulphide are suspended in a solution of 1 part of Ceres blue and 34 parts of cellulose acetobutyrate (acetyl content 13 percent, butyryl content 37 percent) in a mixture of 40 parts of cyclohexanone and 25 parts of diphenoxyethyl formal. The suspension is heated to 50° C. and dispersed in 216 parts of a 16.7 percent aqueous sodium chloride solution, whereafter the emulsion obtained is incorporated by stirring into 420 parts of 14.3 percent sodium hydroxide solution. After a reaction time of 15 minutes at 70° C., all the cellulose acetobutyrate is converted into cellulose and the entire zinc sulphide is transferred into the capsule wall, which means that 118 percent of zinc sulphide, calculated on the weight of the capsule wall, are incorporated therein. The size of the capsules is between 10 and 80$\mu$. They show a pale blue color, whereas capsules prepared in accordance with the same specification without zinc sulphide show a color similar to deep blue ink. A distinct covering effect is thus caused by the strong pigmentation of the capsule wall.

EXAMPLE IV 1 part of Ceres blue was dissolved together with 30 parts of cellulose propionate in a mixture of 44 parts of cyclohexanone and 25 parts of diphenoxyethyl formal and 20 parts of titanium dioxide were suspended in this solution. The suspension was heated to 85° C. and dispersed in 198 parts of 9 percent aqueous sodium chloride solution, whereafter the emulsion thus obtained was incorporated by stirring into 420 parts of 14.3 percent aqueous sodium hydroxide solution. After a reaction time of 15 minutes at 70° C., capsules were obtained, and all the titanium dioxide was incorporated into the walls of the capsules, which consist of cellulose, based on the weight of the capsule wall, the amount of titanium dioxide is 67 percent. The size of the capsules is approximately 20–40$\mu$. Differing from capsules consisting of cellulose, which contain no titanium dioxide in the capsule wall and appear to be of a deep blue, the capsules made according to this example are pale blue.

EXAMPLE V 1 part of Ceres blue was dissolved together with 24 parts of cellulose acetate in a mixture of 50 parts of cyclohexanone and 25 parts of diphenoxyethyl formal; 20 parts of titanium dioxide were suspended in this solution. The suspension was heated to 85° C. and dispersed in 198 parts of 9 percent aqueous sodium chloride solution, whereafter the emulsion obtained was incorporated by stirring into 420 parts of 14.3 percent sodium hydroxide solution. Capsules were obtained after a reaction time of 15 minutes at 70° C., in whose walls, consisting of cellulose, all the titanium dioxide is incorporated, this amounting to 166 percent of titanium dioxide, based on the weight of the capsule wall. The size of the capsules is between 1 and 40 $\mu$. They are pale blue in color.

According to the process indicated in examples I to V, it is possible to incorporate other finely divided solid substances into the capsule wall, and in fact calcium carbonate, a mixture of titanium dioxide and zinc sulphide 1:1.5, tertiary calcium phosphate, a mixture of titanium dioxide and calcium carbonate 1:2.4, and also barium sulphate and zinc oxide may be so incorporated. In all these cases, by incorporation of the solid substances into the capsule wall, an increase in the stability of the capsules is produced, this increase being more pronounced as the quantity of incorporated solid substance becomes larger. It is accordingly possible for the stability of the capsules to be graduated as required and they may be adapted to the actual purpose for which the capsules are being used.

Another possibility of producing capsules consists in the conversion of cellulose nitrate by denitration, whereby products are obtained which are very similar to cellulose. As shown by the following examples in this case, it is likewise possible to incorporate large quantities of finely divided solid substances in the capsule walls to obtain a considerable improvement in the stability of the capsules as well as in optical important properties thereof.

EXAMPLE VI 0.5 part of titanium dioxide is suspended in 10 parts of a solution of 1.2 parts of cellulose nitrate (N-content = 10.92 percent), in a mixture of 6.2 parts of cyclohexanone and 2.5 parts of diphenoxyethyl formal. The suspension is heated to 100° C. and it is emulsified in 50 parts of a 20 percent solution of sodium chloride in water at 75° C. After cooling to 60° C., 50 parts by volume of a 14 percent solution of sodium hydrogen sulphide in water are added to the emulsion and the mixture is maintained at 40° C. while stirring for 1 hour.

After this time, all the cellulose nitrate which had been present in the droplets of the emulsion is denitrated and the capsules thereby formed contain in their wall all the titanium dioxide, corresponding to 66 percent, based on the weight of the capsule wall.

The capsules are washed with water. They are considerably more stable than capsules of the same type and size which do not contain any titanium dioxide in their wall. The size of the capsules is 30 to 50 $\mu$.

EXAMPLE VII 1.44 parts of titanium dioxide are suspended in 15 parts of a solution of 1.2 parts of cellulose nitrate (N-content = 10.92 percent) and 0.1 percent of Ceres blue in a mixture of 6.2 parts of cyclohexanone and 2.5 parts of diphenoxyethyl formal. The suspension is heated to 100° C. and it is emulsified in 75 parts of a 20 percent sodium chloride solution in water at 75° C. After cooling to 60° C., 75 parts by volume of a 14 percent solution of sodium hydrogen sulphide in water are added to the emulsion and the mixture is maintained at 40° C. while stirring for 1 hour. After this time, all the cellulose nitrate in the droplets is denitrated and the capsules which have formed contain in their wall the entire quantity of titanium dioxide, corresponding to 127 percent, based on the weight of the capsule wall. The capsules are washed with water and separated out; they are only pale blue in color, because of the high titanium dioxide content in the capsule wall; without titanium dioxide in the capsule wall, they are deep blue. The size of the capsules is between 20 and 40 $\mu$.

EXAMPLE VIII 1.03 parts of carbon black are suspended and finely dispersed in 15 g. of a solution of 1.2 parts of cellulose nitrate (N-content = 10.92 percent) in a mixture of 6.3 parts of cyclohexanone and 2.5 parts of diphenoxyethyl formal. The suspension is heated to 70° C. and it is emulsified in 70 parts of a 20 percent sodium chloride solution in water at 70° C. After cooling to 50° C., 73 parts by volume of a 14 percent solution of sodium hydrogen sulphide in water are added to the emulsion and the mixture is maintained for 45 minutes at 40° C. while stirring steadily. After this time, all the cellulose nitrate is denitrated and the capsules which have formed contain in their wall all the carbon black, corresponding to 91 percent, based on the weight of the capsule wall. The capsules are black and very stable; their size is on average about 30 $\mu$.

Similarly to example VIII, any desired smaller quantities than 91 percent of carbon black can be incorporated into the capsule wall, whereby the possibility is provided of a graduation of the stability and optical properties of the capsules in this case, too.

EXAMPLE IX 0.7 parts by weight of Milori blue (pigment content 50 percent) flushed in dibutyl phthalate are dispersed in a solution of 1.8 parts of cellulose nitrate (N-content = 10.92 percent) in a mixture of 9.3 parts of cyclohexanone and 3.4 parts of dibutyl phthalate. The suspension is heated to 100° C. and it is emulsified in 50 parts of a 20 percent solution of sodium chloride in water at 70° C. After cooling to 50° C., 50 parts by volume of a 14 percent solution of sodium hydrogen sulphide in water are added to the emulsion and the mixture is maintained at 40° C. while stirring for 45 minutes. The capsules thus formed contain all the Milori blue in the wall. The size of the capsules is 20–80 $\mu$.

EXAMPLE X

Into a solution of 1 part of a color forming compound and 25 parts of cellulose acetobutyrate (13 percent acetyl content, 37 percent butyryl content) in a mixture of 49 parts of cyclohexanone and 25 parts of chlorinated paraffin, 94 parts of fine zinc sulphide are suspended. The suspension is heated to 80° C. and dispersed in 323 parts of a 9.3 percent aqueous sodium chloride solution, whereafter the emulsion obtained is incorporated by stirring into 275 parts of an 18 percent aqueous solution of sodium hydroxide. After a reaction time of 15 minutes at 70° C., the entire quantity of cellulose acetobutyrate which had been present in the droplets of the emulsion is converted into cellulose, capsules having formed, in the walls of which, consisting of cellulose, the entire quantity of zinc sulphide is contained. Consequently, 750 percent of zinc sulphide have been incorporated into said wall. The size of the capsules is 5 to 10 $\mu$.

For better illustration of the process according to the invention, reference is made to the diagrammatic graphic representation which is self-explanatory.

In the following a few examples are given for preparing color reaction papers with a material produced according to the process of this invention containing microcapsules, and for incorporating this material into paper pulp which is worked up in the production of color reaction papers, as known per se.

EXAMPLE XI 10 parts of cellulose capsules (diameter about 10–20 $\mu$), which contain in their walls 133 percent of zinc sulphide, based on the weight of the cellulose, and of which the content consists of a 4 percent solution of a mixture of 1 part of N-benzoyl leucomethylene blue and 3 parts of 3-methyl spirodinaphthopyran in liquid chlorinated paraffin, are suspended in a trituration of 12 parts of clay, which is treated with a strong acid, with 78 parts of a 7 percent solution of polyvinyl alcohol in water. Using the coating composition obtained in this manner, a white paper of 40 g./m.$^2$ is coated in known manner with an application of 50 g./m.$^2$. After drying, a pressure-sensitive "self-writing" color reaction paper is obtained which supplies a blue record.

EXAMPLE XII 24 parts of paper pulp (cellulose content 5 percent) are mixed with 1 part of cellulose capsules (wall 320 percent zinc sulphide, based on cellulose, content 4 percent solution of 3-methyl-spirodinaphthopyran in liquid chlorinated paraffin) and 4 parts of a trituration of 20 parts of acid clay with 80 parts of water, and sheets of paper are produced from this mixture.

EXAMPLE XIII 12 parts of cellulose capsules (diameter about 10–20 $\mu$), in the wall of which are incorporated 750 percent of zinc sulphide, based on the weight of the cellulose, and of which the content consists of a 4 percent solution of a mixture of 1 part of N-benzoyl leucomethylene blue and 3 parts of 3-methyl spirodinaphthopyran in liquid chlorinated paraffin, are suspended in a trituration of 12 parts of clay, which is treated with a strong acid, with 78 parts of a 7 percent solution of polyvinyl alcohol in water. With the coating composition obtained in this manner, a white paper of 40 g./m.$^2$ is coated in a known manner with an application of 50 g./m.$^2$.

EXAMPLE XIV 8 parts of microcapsules of denitrated cellulose nitrate, in the wall of which are incorporated 110 percent of titanium dioxide and the content of which consists of a 4 percent solution of 3-methyl spirodinaphthopyran in diphenoxyethyl formal, are suspended in a trituration of 1 part of a clay treated with acid in 9 parts of a 5 percent polyvinyl alcohol solution in water and a white paper of 40 g./m.$^2$ is coated with this coating composition.

EXAMPLE XV 26.4 parts of microcapsules of cellulose, in the wall of which are incorporated 133 percent of zinc sulphide and which contain a solution of 3 parts of 3-methyl spirodinaphthopyran and 1 part of N-benzoyl leucomethylene blue in 96 parts of liquid chlorinated paraffin, are suspended in 105 parts of a 3 percent solution of polyvinyl alcohol in water. A white paper of about 40 g./m.$^2$, coated with this composition, represents a transfer sheet which can be used in a known manner for duplicating purposes in combination with a sheet carrying a coating which consists of a clay treated with acid.

What is claimed is:

1. A process for the production of microcapsules enclosing liquid and/or solid substances which comprises converting into a polymeric insoluble reaction product a film-forming compound consisting of a cellulose ester of an organic acid dissolved in the dispersed phase of a liquid dispersion system which contains dissolved in its continuous phase sodium hydroxide that reacts with said cellulose ester in solution under saponification to give a polymeric insoluble reaction product, and incorporating particles of finely divided solid substances selected from the group consisting of titanium dioxide, zinc sulphide, a mixture of the two, tertiary calcium phosphate, barium sulphate, zinc oxide, a mixture of titanium dioxide and calcium carbonate and carbon black, into the walls of said microcapsules during their formation in amounts from about 100 percent up to 750 percent calculated on the organic part of the capsule walls, thereby increasing the resistance of the walls to mechanical stress so as to positively exclude damaging of the walls during processing and storage.

2. A process for the production of microcapsules enclosing liquid and/or solid substances which comprises converting into a polymeric insoluble reaction product a film-forming compound consisting of cellulose nitrate dissolved in the dispersed phase of a liquid dispersion system which contains dissolved in its continuous phase sodium hydrogen sulphide that reacts with said cellulose nitrate in solution under denitration to give a polymeric insoluble reaction product, and incorporating particles of finely divided solid substances selected from the group consisting of titanium dioxide, zinc sulphide, a mixture of the two, tertiary calcium phosphate, barium sulphate, zinc oxide, a mixture of titanium dioxide and calcium carbonate and carbon black into the walls of said microcapsules during their formation in amounts from about 100 percent up to 750 percent calculated on the organic part of the capsule walls, thereby increasing the resistance of the walls to mechanical stress so as to positively exclude damaging of the walls during processing and storage.

* * * * *